F. J. GIBBS.
AUXILIARY TIRE ATTACHMENT.
APPLICATION FILED AUG. 31, 1912. RENEWED SEPT. 5, 1914.
1,137,963.
Patented May 4, 1915.
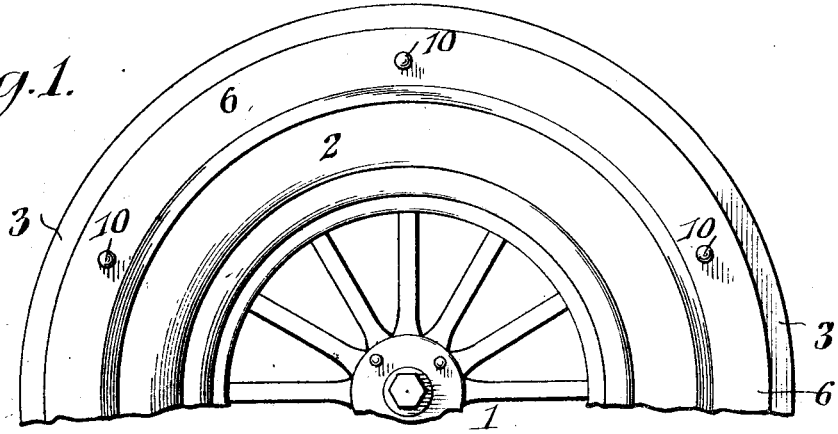
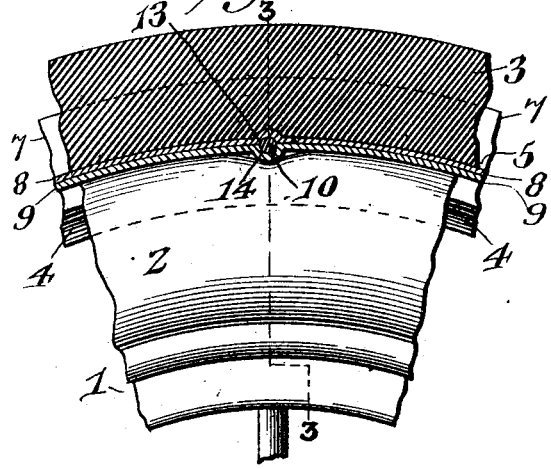
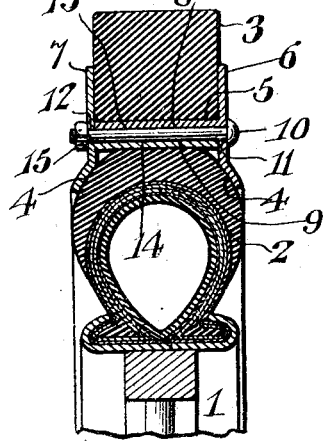
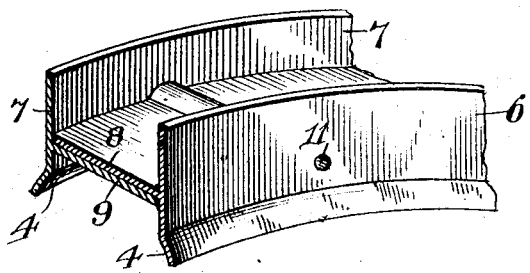
Frank J. Gibbs, INVENTOR
WITNESSES
BY
ATTORNEY

UNITED STATES PATENT OFFICE.

FRANK J. GIBBS, OF TYRONE, PENNSYLVANIA.

AUXILIARY-TIRE ATTACHMENT.

1,137,963.  Specification of Letters Patent.  Patented May 4, 1915.

Application filed August 31, 1912, Serial No. 718,156. Renewed September 5, 1914. Serial No. 860,466.

*To all whom it may concern:*

Be it known that I, FRANK J. GIBBS, a citizen of the United States, residing at Tyrone, in the county of Blair and State of Pennsylvania, have invented a new and useful Auxiliary-Tire Attachment, of which the following is a specification.

The invention relates to an auxiliary tire attachment for pneumatic tires.

The object of the present invention is to provide for pneumatically tired wheels a simple, inexpensive and efficient auxiliary tire, adapted to be readily mounted on an ordinary pneumatic tire, and capable of completely protecting the same and of relieving a pneumatic tire of punctures and all other troubles resulting from direct contact of the tire with the surfaces of the roadways.

A further object of the invention is to provide a device of this character equipped with an outer solid resilient tire, arranged to receive the wear and tear and adapted to contribute to the cushioning action of the wheel.

With these and other objects in view, the invention consists in the construction and novel combination of parts hereinafter fully described, illustrated in the accompanying drawing, and pointed out in the claims hereto appended; it being understood that various changes in the form, proportion, size and minor details of construction, within the scope of the claims, may be resorted to without departing from the spirit or sacrificing any of the advantages of the invention.

In the drawings:—Figure 1 is a side elevation of a portion of a pneumatically tired wheel provided with an auxiliary tire and rim, constructed in accordance with this invention. Fig. 2 is an enlarged longitudinal sectional view of a portion of the same. Fig. 3 is a transverse sectional view on the line 3—3 of Fig. 2. Fig. 4 is a detail sectional perspective view of a portion of the auxiliary rim.

Like numerals of reference designate corresponding parts in all the figures of the drawing.

In the accompanying drawing in which is illustrated the preferred embodiment of the invention, 1 designates a wheel, designed for use on automobiles and various other motor vehicles, and provided with a pneumatic tire 2 and equipped with an auxiliary rim and an auxiliary solid rubber tire 3. The pneumatic tire may be of any preferred type, and its outer tread portion fits within an inner annular channel 4 of the auxiliary rim, which is also provided with an outer annular channel 5 for the reception of the solid resilient tire 3.

The auxiliary rim comprises in its construction spaced annular side plates or members 6 and 7 and telescopic cylindrical flanges or members 8 and 9, formed integral, respectively, with the side plates or members 6 and 7 and extending inwardly from the same at points intermediate of the inner and outer edges of the side plates or members, as clearly illustrated in Fig. 4 of the drawing. The transversely disposed cylindrical flanges or members are of uniform width and extend entirely across the inner and outer annular channels and abut against the inner faces of the opposing side plates or members 6 and 7, which extend inwardly and outwardly from the cylindrical flanges or members to form the sides of the inner and outer channels.

The outer portions of the side plates are straight to fit the flat side faces of the solid outer tire, and the inwardly projecting portions of the side plates have preferably a slight curvature to conform to the configuration of the pneumatic tire, which is securely braced by the auxiliary rim. The auxiliary rim affords complete protection for the pneumatic tire without interfering with the cushioning action thereof, and the resiliency of the wheel is increased by the solid rubber outer tire. The solid rubber outer tire, which receives all the wear and tear, may be readily replaced at a comparatively low cost.

The cylindrical telescopic flanges or members which fit snugly one within the other, form a two-part circumferential dividing web and they may be easily and quickly placed on the pneumatic tire. They are securely retained in assembled relation by means of a plurality of transverse bolts 10, extending through perforations 11 and 12 of the side plates or members and arranged in transverse grooves 13 and 14 formed in the contiguous faces of the cylindrical flanges or members. The openings 11 and 12 are transversely alined, and the grooves 13 and 14, which are located at the same register when the parts are assembled and they form inner and outer projections which are embedded in the tread of the pneumatic tire and the inner face of the solid outer tire, whereby the latter and the auxiliary rim are prevented from creeping circumferentially around the wheel. This is an advantage as the inner portions of the side plates may be terminated at opposite sides of the outer portion of the pneumatic tire and it obviates the necessity of extending the side plates to the rim or felly of the wheel. The bolts are equipped with nuts 15, but any other suitable fastening devices may be employed.

What is claimed is:—

1. The combination with a pneumatic tire, and an outer solid tire arranged in spaced relation, of an auxiliary rim provided with inner and outer channels receiving the said tires and composed of annular side members, and cylindrical telescoping flanges or members extending from the inner faces of the side members at points intermediate of the inner and outer edges thereof and provided with registering transverse bends forming grooves and providing inner and outer projections, which are embedded in the said tires to prevent the rim and the outer tire from creeping, and fastening devices piercing the side members and arranged in the registering grooves and securing the parts together, said fastening devices passing between the outer and pneumatic tires without piercing either of them.

2. The combination with a pneumatic tire, and an outer solid tire spaced from the pneumatic tire, of an auxiliary rim composed of annular spaced side plates, an annular flange formed integral with one of the side plates and extending across the space to the other side plate and forming inner and outer channels which receive the said tires, said annular flange having transverse bends which are embedded in the solid tire to prevent creeping, said plates having openings in alinement with the said bends, and fastening bolts passed through the openings of the side plates within the said bends and securing the parts together.

In testimony, that I claim the foregoing as my own, I have hereto affixed my signature in the presence of two witnesses.

FRANK J. GIBBS.

Witnesses:
  C. A. BECK,
  J. B. HENDERSON.